Oct. 29, 1929.    M. BERMAN    1,733,481
MOTION PICTURE FILM
Filed Jan. 18, 1924
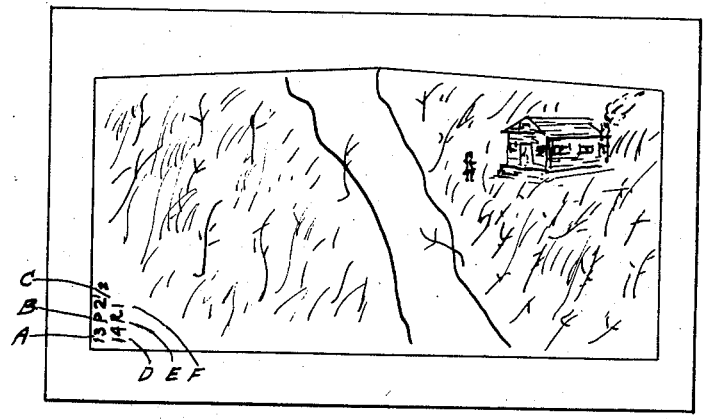
Fig. 1.
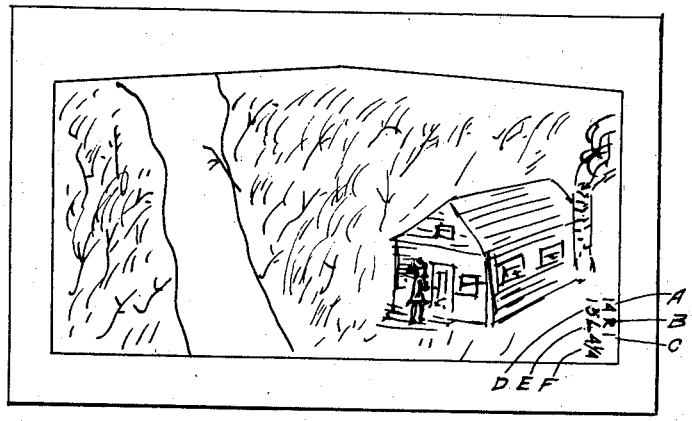
Fig. 2.
13. HEARTS AND FLOWERS.
14. KISS ME
15. LEAD, KINDLY LIGHT.
16. AMERICA
17. STAR SPANGLED BANNER.
18. COLUMBIA
19. TIPPERARY
20. DIXIE
Fig. 3.
N. SAD
O. HAPPY
P. PASTORAL
Q. AGITATING
R. ANGRY
S. SENTIMENTAL
T. STEADY
Fig. 4.
INVENTOR
Morris Berman Patented Oct. 29, 1929

1,733,481

UNITED STATES PATENT OFFICE

MORRIS BERMAN, OF BROOKLYN, NEW YORK

MOTION-PICTURE FILM

Application filed January 18, 1924. Serial No. 687,002.

This invention relates to motion picture films and their screen exhibition, and has particular relation to an improvement which I term "mood index," for indicating to a musician the moods, emotional type or dramatic quality of the music to be played while the film is being exhibited, and relates further to means for denoting the title of the accompaniment to be played to the film and to the duration of said accompaniment.

The methods now in vogue for determining what music is to be played to harmonize with the emotions induced by the exhibition of the motion picture are, first; to have the accompanist watch the screen at various times and select the music during the progress of the motion picture without using an aid to such selection known as a cue sheet. One type of such a cue sheet is shown in the patent to Moses J. Mintz, dated July 31, 1923, No. 1,463,288. Second; to arranged the music in proper order beforehand through general advance knowledge of the character of the motion picture without using a cue sheet; third; to arrange the music by means of a cue sheet, such as is above referred to.

In employing the first method time is required to select new music, thereby interrupting the continuity of the playing, which is generally undesirable; furthermore, a dramatic situation or scene is often noted on the screen and proper music is selected, but it so happens that this scene lasts for a time too short to warrant the inconvenience of selecting music to harmonize with it. In employing the second method it is found difficult to arrange compositions in proper order beforehand without the guidance of a cue sheet, as it generally requires careful advance planning and comparison with the motion picture, to determine the correct order of the situations involved. In employing the third method, that of guidance by a cue sheet, the difficulty arises that the cue appears on the screen for a limited time, and if not noticed by the musician, who generally has to read his own music besides watching the cues, the music with its corresponding emotional appeal will not change till the error is discovered, if discovered at all, thus detracting from the value of the music played.

With the emyployment of my improved film having a mood index, indicating the dramatic mood or emotional type of the composition to be played or a reference to a composition name or type on a prearranged list, a musician will be able readily to ascertain the type of, or the symbol indicating the title of, the composition to be played. It, therefore, becomes unnecessary that he should notice the tile or action cue at the exact moment it appears on the screen. The mood index, consisting of a symbol representing the type of composition or a symbol representing the time period the composition endures, or a title symbol, corresponding to a similar symbol on a prearranged list, or any combination of some or all of said symbols may be imprinted or otherwise marked on the film to indicate only the current composition to be played to accompany only that portion of the film referred to, or, if desired, the indices of one or more succeeding compositions may also be marked on the same part of the film simultaneously, with or without the current index.

In the drawings,

Figure 1 is a view of one of the pictures of a film with the mood index shown on said film.

Figure 2 is a similar view of one of the succeeding pictures showing another position of the mood index.

Figure 3 is a view of a list of music titles, and

Figure 4 is a list of emotions.

I prefer to utilize my invention in connection with a film in which different dramatic or other situations are depicted, each situation, of course, comprising a number of pictures. It is intended preferably, though not necessarily that for each different dramatic situation a different symbol be used. For instance, while in comedy pictures, the comic situation lasts throughout, different symbols are preferably used in various parts of the picture, so that one composition will not be played for so long a time that it becomes monotonous. On the other hand, where there is a succession of short scenes, the same symbol may be used for several scenes to avoid the rapid playing in succession of different short selections.

The symbol 1 is the identifying number or other reference marking each item of the list 2 of music titles 3. The symbol 4 represents the emotional type of composition to be played by the accompanist and corresponds to the identifying symbol on the list of emotions 6 during the time the film marked with said symbol is exhibited. The symbol 7 indicates the length of time such composition is to endure. The symbols 8, 9, and 10 indicate respectively the music title, music type or emotion, and time duration of the composition to be played immediately after the playing of the current composition is completed.

For musicians who do not us a cue sheet, my invention indicates without lengthy and inconvenient reference to the action and plot of the motion picture, the emotional type of the music to be played and is informative in advance, of the duration of such music. When two sets of mood indices as 1, 4, 7 and 8, 9, 10 respectively, are both used, the musician can ascertain in advance which single composition may be substituted for the two indicated, having emotions common to both and for an interval of time equal to the combined duration of both of said indicated compositions. Another advantage of using two or more indices is that it may not take much longer to select and distribute to the musicians several compositions than it takes for a single composition, resulting in fewer undesirable interruptions of the playing during the combined duration of the several compositions.

The advantage of my mood index for musicians who do use a cue sheet is that if the musicians should not notice a cue at the time when it first appears on the screen, they could ascertain the current cue from the projection of the film symbols, thus assuring more reliable progression of music to fit the motion picture, as well as less strain on the part of the musician watching for the cues. By projecting the succeeding symbols 8, 9 and 10 to different relative points a change from one mood index to the next is made more apparent to the musician.

Another advantage of my mood index for those who use cue sheets, on which sheets the approximate duration of each composition is stated, is that owing to running the films at a speed which is not normal, or owing to cutting the film not as assumed in the cue sheet, accidently or otherwise, or owing to the use of a different number of reels than assumed in the cue sheet, difficulty is experienced in using cue sheets, which difficulty is overcome with my mood index using the proper title number 1, or like symbol.

It will be understood that the film symbols may be projected in any suitable manner for view by the musician, as for instance, inconspicuously on the main screen, or, if desired, on an auxiliary screen, by means and methods well known in the art and which need not be described here.

It will also be understood that the various symbols embodying my invention may be imprinted on successive or consecutive pictures of a film, if desired, or on alternate pictures or in any desired spacing, so that the symbols may be continuously exhibited with the film, or exhibited at intervals or in the form of flashes as may be convenient and desirable.

As many variations or modifications could be made in the above detail features, indicating data or arrangement of cue title symbols, emotion symbols, and time symbols, from that herein described, I therefore reserve the right to all such variations or modifications as properly fall within the scope of my invention and the terms of the following claim.

I claim:

In a motion picture film including a series of pictures, the combination of a prearranged list of types of emotions, a series of letters in alphabetical order identifying each item of said list, an unchanging symbol corresponding with one of the letters of said list in the same relative position on a series of said pictures for the purpose of instructing an accompanist of the type of emotion corresponding to said pictures, a second prearranged list of music titles, identifying numerals arranged in numerical order to identify each item of said list of titles, an unchanging numeral in the same relative position on a series of pictures and arranged adjacent to said first mentioned symbol for the purpose of instructing the accompanist of the title of the selection to be played to accompany the exhibition of said pictures and a numeral adjacent to said symbols and in the same relative position on a series of pictures, said numeral instructing the accompanist regarding the number of minutes that a selection is to be played.

In testimony whereof, I have signed my name to this specification this 17th day of January, 1924.

MORRIS BERMAN.